(12) United States Patent
Madala et al.

(10) Patent No.: US 11,677,637 B2
(45) Date of Patent: Jun. 13, 2023

(54) CONTEXTUAL UPDATE COMPLIANCE MANAGEMENT

(71) Applicant: DELL PRODUCTS L.P., Round Rock, TX (US)

(72) Inventors: Raveendra Babu Madala, Bangalore (IN); Santosh Hanamant Gore, Bangalore (IN); Sudhir Vittal Shetty, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 258 days.

(21) Appl. No.: 16/701,638

(22) Filed: Dec. 3, 2019

(65) Prior Publication Data

US 2021/0168046 A1    Jun. 3, 2021

(51) Int. Cl.
H04L 41/00       (2022.01)
H04L 41/0806    (2022.01)
G06F 8/61         (2018.01)

(52) U.S. Cl.
CPC ............... *H04L 41/24* (2013.01); *G06F 8/61* (2013.01); *H04L 41/0806* (2013.01); *H04L 41/20* (2013.01)

(58) Field of Classification Search
CPC ..... H04L 41/24; H04L 41/0806; H04L 41/20; G06F 8/61
See application file for complete search history.

(56) References Cited

U.S. PATENT DOCUMENTS

| | | | |
|---|---|---|---|
| 8,296,781 B1* | 10/2012 | Lebaredian | G06F 9/4411 719/327 |
| 8,856,862 B2 | 10/2014 | Dimitrakos et al. | |
| 9,191,380 B2 | 11/2015 | Anderson et al. | |
| 9,923,928 B2 | 3/2018 | Kimer et al. | |
| 2007/0169081 A1* | 7/2007 | Zhao | G06F 8/65 717/168 |
| 2008/0077530 A1 | 3/2008 | Banas et al. | |
| 2008/0201354 A1* | 8/2008 | Abel | G06F 8/20 |
| 2008/0235388 A1* | 9/2008 | Fried | H04L 41/12 709/231 |
| 2012/0209654 A1 | 8/2012 | Romagnino et al. | |
| 2012/0317266 A1* | 12/2012 | Abbott | G06Q 30/0278 709/224 |
| 2013/0275429 A1 | 10/2013 | York et al. | |
| 2014/0068551 A1* | 3/2014 | Balasubramanian | G06F 8/36 717/107 |
| 2014/0101467 A1* | 4/2014 | Jubran | H04L 41/0856 713/310 |
| 2014/0199987 A1 | 7/2014 | Wright et al. | |
| 2014/0207486 A1 | 7/2014 | Carty et al. | |

(Continued)

*Primary Examiner* — Nicholas R Taylor
*Assistant Examiner* — Sanjoy K Roy
(74) *Attorney, Agent, or Firm* — Jackson Walker LLP; Christopher J. Rourk

(57) ABSTRACT

A process for configuring hardware in a network environment, comprising retrieving a catalog index using a processor, selecting a catalog for a new hardware component, selecting a plurality of software applications for the new hardware product from the catalog, determining a context for the new hardware component, wherein the context identifies one or more variable parameters for one or more of a plurality of software applications and installing the plurality of software applications on the hardware product as a function of the context.

20 Claims, 2 Drawing Sheets

(56) References Cited

U.S. PATENT DOCUMENTS

| | | |
|---|---|---|
| 2015/0373037 A1 | 12/2015 | Howard et al. |
| 2016/0050116 A1* | 2/2016 | Sheshadri ............... H04L 67/10 |
| | | 709/221 |
| 2017/0171024 A1* | 6/2017 | Anerousis ............... H04L 67/10 |
| 2018/0027006 A1 | 1/2018 | Zimmermann et al. |
| 2018/0060051 A1* | 3/2018 | Ramalingam ........... H04L 67/34 |
| 2019/0327144 A1* | 10/2019 | Tembey .............. H04L 41/0869 |
| 2019/0334909 A1* | 10/2019 | Schmitt ................. G06F 3/0604 |

* cited by examiner

CONTEXTUAL UPDATE COMPLIANCE MANAGEMENT

TECHNICAL FIELD

The present disclosure relates generally to networked processors, and more specifically to a system and method for automatically configuring a new hardware component in a network.

BACKGROUND OF THE INVENTION

Adding a new hardware component to a network is a manual process, and requires an extensive amount of specialized knowledge. In particular, changes to existing applications occur at different times for different applications, and coordinating those changes is typically performed on an ad hoc basis.

SUMMARY OF THE INVENTION

A process for configuring hardware in a network environment is disclosed. The process includes retrieving a catalog index using a processor and selecting a catalog for a new hardware component. A plurality of software applications are selected for the new hardware product from the catalog, and a context for the new hardware component is determined. The context identifies one or more variable parameters for one or more of a plurality of software applications. The plurality of software applications are installed on the hardware product as a function of the context.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
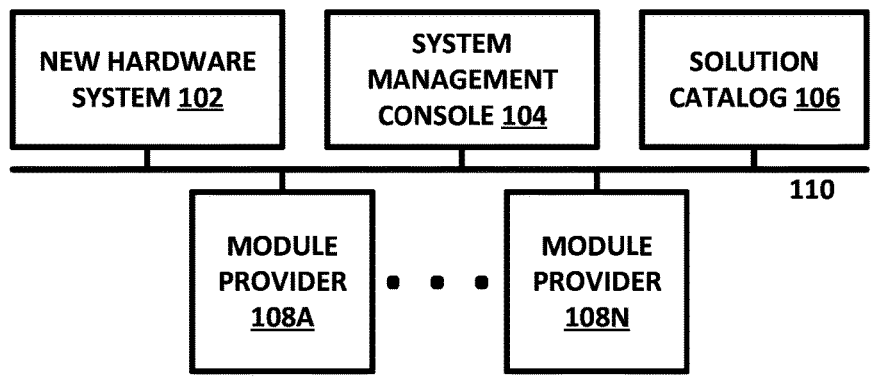
FIG. 1 is a diagram of a system for detecting and implementing hardware configuration solutions in a user environment, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

At present there is no automatable method for detecting a solution for a new item of hardware, such as a desktop device or a server. Solution compliance requirements are usually provided in several readme files. Administrators gather this information and author scripts for ensuring compliance. Any time an update to a component is required, a system administrator has to test applications in a lab environment to study the potential impact. Once the administrator is sure about impact, only then is the update rolled out to the production environment.

A user typically sets up hardware and then installs a set of software or applications on that hardware for serving their unique needs. In this regard, "software" can refer to a set of algorithms that are configured to be saved to memory devices and implemented using a processor or other complex groups of electronic devices, and an application can refer to a set of algorithms that operates in conjunction with other algorithms, such as an operating system (which is a set of algorithms that are used to control the operation of a large scale processor and associated support systems such as input/output devices).

During the hardware and software set up process for a processor-related system such as a personal computer or a server, a user can use a system management console such as the OpenManage Enterprise console, available from Dell EMC of Austin Tex., for managing their systems. A user of such processor-related systems will typically have several associated software applications that are associated with the installation and configuration process, such as VMware vSAN™ available from VMware of Palo Alto Calif., which can aggregate local or direct-attached data storage devices to create a single storage pool shared across hosts in a vSAN cluster, VXRail available from Dell EMC of Austin Tex., which can provide VMware integration for software defined data centers, Microsoft Exchange available from Microsoft of Redmond Wash., SAP HANA available from SAP of Walldorf Germany or other suitable systems. Each of these solutions has specific firmware, driver and operating environment requirements. A system management console like OpenManage Enterprise can be used to support firmware compliance of target systems against a specific single catalog definition. In a data center environment, a compliance report may need to be created against multiple catalogs depending on the solution that exists on each target system/node. This requirement creates a number of issues that must be addressed to meet and maintain the solution requirements.

For example, one issue is that there is presently no automatic method for detecting a solution and determining the solution compliance. It is also difficult to determine the impact of a component update on a particular solution. Furthermore, several steps are typically needed to prepare a system for a particular solution.

The present disclosure is directed to solution-specific catalogs or templates that contain data that enables the detection of a solution and associated information about methods that ensure compatibility needs are met for that solution. The disclosed algorithms can be used with a system management console such as OpenManage Enterprise to detect solutions. Solution-specific compliance reporting and management can also be provided.

The present disclosure provides a number of technical advantages. One technical advantage is a unique extendable mechanism for detecting a solution. Another technical advantage is a dynamic method for determining solution compliance. Another technical advantage is a unique method for monitoring solution compliance. Another technical advantage is a unique automated method for preparing a system for a particular solution. Yet another technical advantage is a unique method for customizing the solution compliance requirements.

The present disclosure facilitates users in easily managing several solutions in their environment. It also enables the users in adopting the updates quickly as it reduces the steps required for adopting updates. It also enables the users in customizing the solution requirements.

In one example embodiment, a context detection catalog can be published, as well as a solution-specific catalog for all the supported solutions. The context detection catalog can be configured to provide information about the context detection modules that can be used for detecting the supported solutions and contexts. The information about the context detection modules can include location, module operating environment, method for invoking them, method for interpreting the results and other suitable information. OpenManage Enterprise or other suitable system management consoles can be used to implement the present disclosure.

FIG. 1 is a diagram of a system 100 for detecting and implementing hardware configuration solutions in a user environment, in accordance with an example embodiment of the present disclosure. System 100 includes new hardware system 102, system management console 104, solution catalog 106, module providers 108A through 108N and network 110, each of which can be implemented in hardware or a suitable combination of hardware and software.

New hardware system 102 can include one or more hardware systems or components and associated algorithmic instructions that are stored in one or more memory devices, which cause the one or more hardware systems or components to perform predetermined functions. These algorithmic instructions are typically referred to by persons of skill in the art as "applications," "programs," "software" or other similar terms, and may need to be periodically updated by the providers of those algorithmic instructions in order to correct detected problems, provide new functionality, interoperate properly with other hardware or software or for other suitable purposes. New hardware system 102 is provided with standard functionality, and must be configured and optimized for specific uses, which can be referred to as "solutions."

System management console 104 can include one or more hardware systems or components and associated algorithmic instructions that are stored in one or more memory devices, which cause the one or more hardware systems or components to perform predetermined functions to manage the functionality of servers and processors in a network. In one example embodiment, system management console 104 can generate one or more user interface controls to allow a user to select a solution for new hardware system 102, and which then cause system management console 104 to perform predetermined functions to automatically identify associated algorithms for installation on new hardware system 102. These algorithms can be provided by solution catalog 106, one or more of module providers 108A through 108N or other suitable providers.

Solution catalog 106 can include one or more hardware systems or components and associated algorithmic instructions that are stored in one or more memory devices, which cause the one or more hardware systems or components to perform predetermined functions. These algorithmic instructions can be selected by a user to configure new hardware system 102 for a solution, which can include the ability to perform predetermined functions and to interact with predetermined hardware and software systems. Solutions catalog 106 can include additional functionality required to detect and install the algorithms on new hardware system 102.

Module providers 108A through 108N can include one or more hardware systems or components and associated algorithmic instructions that are stored in one or more memory devices, which cause the one or more hardware systems or components to perform predetermined functions. These algorithmic instructions are typically provided by third parties, and can be separately contacted by new hardware system 102 or system management console 104 to facilitate the configuration of new hardware system 102 to provide a solution.

Network 110 can be implemented using one or more servers, routers or other suitable devices that are used to facilitate network communications over a wireline network, a wireless network, an optical network, other suitable communications media or a suitable combination of such communications media. Network 110 can be used by system management console 104 to monitor and control the installation and operation of new hardware system 102, and to provide communications between new hardware system 102 and solution catalog 106 and module providers 108A through 108N, as discussed further herein.

In operation, system 100 allows new hardware system 102 to be installed and configured to provide a solution, such as a solution that is available from solution catalog 106, a solution that can be modified by a user using system management console 104 and module providers 108A through 108N or other suitable solutions or algorithms. In this manner, new hardware system 102 can be configured for use in a specialized environment with minimal user involvement.

Figure 2:
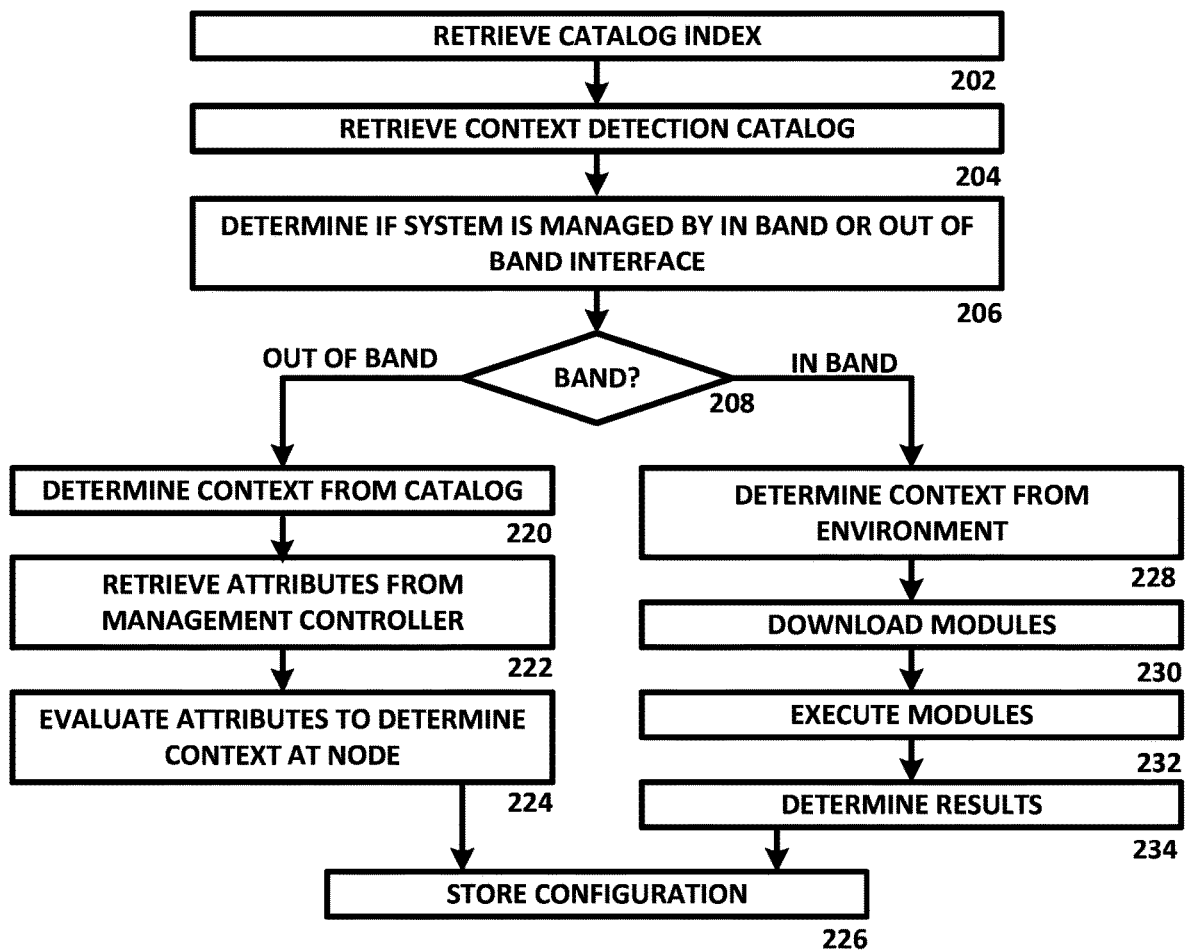
FIG. 2 is a flow chart of an algorithm for detecting hardware configuration solutions in a user environment, in accordance with an example embodiment of the present disclosure.

FIG. 2 is a flow chart of an algorithm 200 for detecting hardware configuration solutions in a user environment, in accordance with an example embodiment of the present disclosure. Algorithm 200 can be implemented in hardware or a suitable combination of hardware and software.

Algorithm 200 begins at 202, where a catalog index is retrieved. In one example embodiment, an OpenManage Enterprise/System Management Console can be used to obtain the catalog index, such as by generating a user interface control that allows a user to select a catalog index, by automatically selecting a new catalog index, or other suitable processes can also or alternatively be used. The algorithm then proceeds to 204.

At 204, a context detection catalog is located and retrieved. In one example embodiment, the context detection catalog information can be located in the catalog index, such as by locating a predetermined catalog index entry, and then retrieved, can be located by retrieving data from a predetermined address or location in the catalog index and then retrieving the associated context detection catalog, or in other suitable manners. The algorithm then proceeds to 206.

At 206, it is determined whether the system is managed by an in band mode or an out of band system interface. In one example embodiment, a mode type variable can be checked to determine its value, a register type can be used to select an operation mode or other suitable processes can also or alternatively be used. The algorithm then proceeds to 208, where the algorithm uses the band mode to proceed to either 220 if the target system is being managed by an out-of-band interface or to 228 if the target system is being managed by an in-band interface.

At 220, the context is determined from the catalog. In one example embodiment, the algorithm can determine attributes that are to be examined for detecting context from the context detection catalog, such as using the identity module for context if the hardware is VxRail compliant, or in other suitable manners. The algorithm then proceeds to 222.

At 222, the attributes are retrieved from the management controller. In one example embodiment, a fetch command can be used to obtain the required attributes from the management controller using a remote access controller or in other suitable manners. The algorithm then proceeds to 224.

At 224, the attributes are evaluated to determine context at the node. Context at the node can include network variables, such as related hardware components on the network, the configuration or settings of those hardware components or other suitable data. The attributes retrieved using the remote access controller can be evaluated, or other suitable processes can also or alternatively be used. The algorithm then proceeds to 226.

At 226, the configuration information is stored. In one example embodiment, the solution or context information can be stored, or other suitable information can also or alternatively be stored.

At 228, a context is determined from an operating environment. In one example embodiment, the context detection modules that are to be downloaded can be determined based on the operating environment. For example, if the solution is vSAN, then an inventory module can detect the workload in the operating system, or other suitable processes can also or alternatively be used. The algorithm then proceeds to 230.

At 230, one or more modules are downloaded or otherwise obtained. In one example embodiment, the context detection modules can be downloaded from a predetermined location, such as a solution-specific catalog or other suitable locations. The algorithm then proceeds to 232.

At 232, the downloaded modules are executed. In one example embodiment, the context detection modules can be pushed to one or more target nodes, which can be configured to execute the context detection modules when they are received, or other suitable embodiments can also or alternatively be used. The algorithm then proceeds to 232.

At 232, the results of the context detection module execution are interpreted. In one example embodiment, the interpretation can include an identification of associated network devices, an identification of associated network device settings, test process results or other suitable data, where the data is then used to configure the new hardware or to take other suitable actions. The algorithm then proceeds to 226.

In operation, algorithm 200 can be used to detect hardware configuration solutions in a user environment, such as to allow a new workstation or server to be configured to a specific network configuration without substantial user involvement or for other suitable purposes. Although algorithm 200 is shown as a flow chart, it can also or alternatively be implemented as an object-oriented diagram, a state diagram, a ladder diagram or in other suitable manners.

Figure 3:
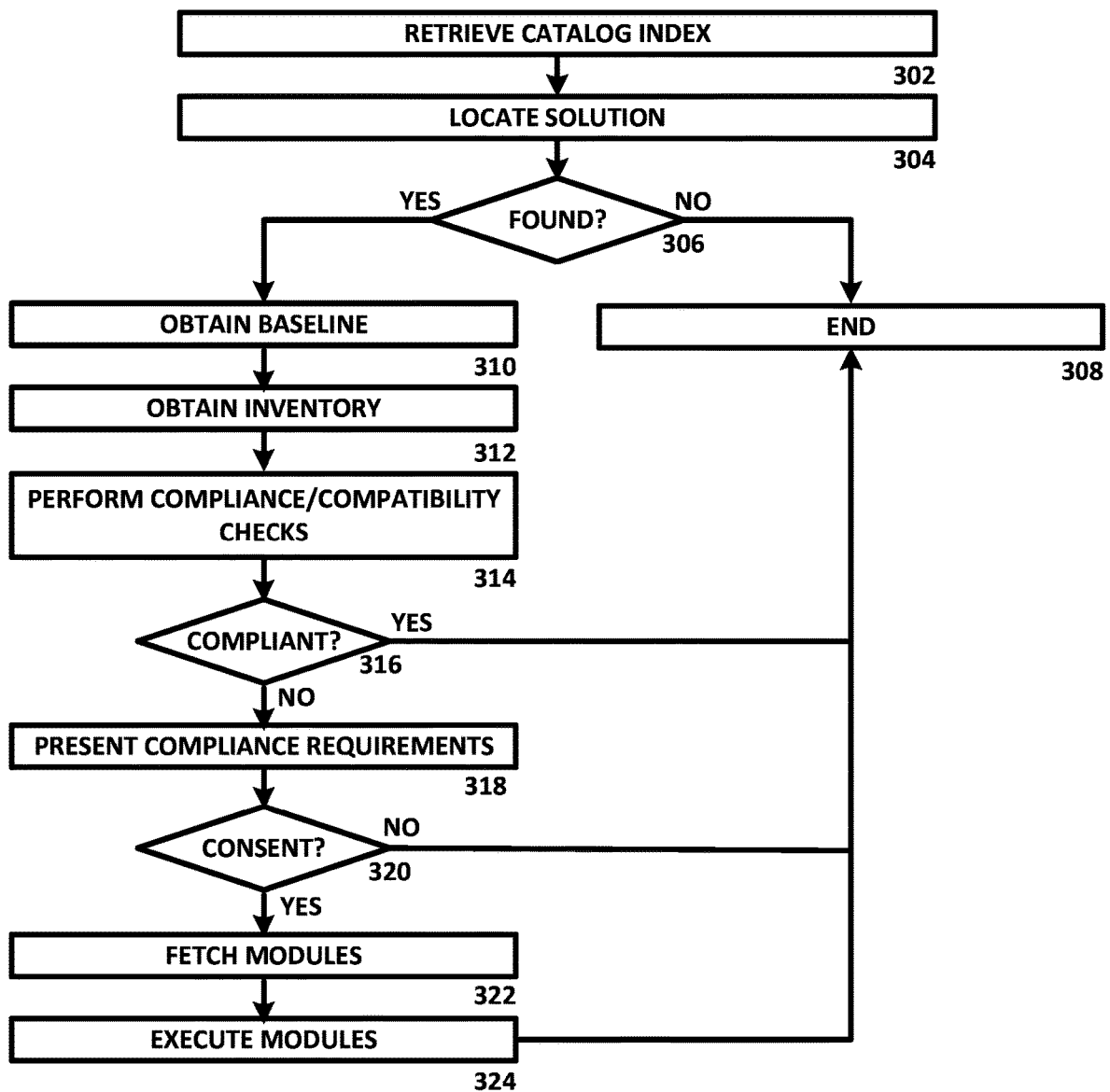
FIG. 3 is a flow chart of an algorithm for determining hardware solution compliance, in accordance with an example embodiment of the present disclosure.

FIG. 3 is a flow chart of an algorithm 300 for determining hardware solution compliance, in accordance with an example embodiment of the present disclosure. Algorithm 300 can be implemented in hardware or a suitable combination of hardware and software.

Algorithm 300 begins at 302, where a catalog index is retrieved. In one example embodiment, an OpenManage Enterprise/System Management Console can be used to retrieve a catalog index or other suitable processes can also or alternatively be used. The algorithm then proceeds to 304.

At 304, the solution is located. In one example embodiment, the solution can be located in a solution/context specific catalog in the catalog index, or other suitable processes can also or alternatively be used. The algorithm then proceeds to 306.

At 306, it is determined whether the solution was found. If it is determined that the solution was not found, the algorithm proceeds to 308, otherwise the algorithm proceeds to 310.

At 310, a baseline is determined for the solution. In one example embodiment, the baseline can be determined by parsing a catalog to obtain solution or context compliance or compatibility data, or other suitable processes can also or alternatively be used. The algorithm proceeds to 312.

At 312, inventory is obtained. In one example embodiment, the inventory can be obtained by fetching the target inventory information, or other suitable processes can also or alternatively be used. The algorithm then proceeds to 314.

At 314, a compliance or compatibility check is performed. In one example embodiment, the target environment compliance can be calculated, or other suitable processes can also or alternatively be used. The algorithm then proceeds to 316.

At 316, it is determined whether the target is compliant. If it is determined that the target is compliant, the algorithm proceeds to 308, otherwise the algorithm proceeds to 318.

At 318, the requirements to make the target compliant in the target environment are displayed to the user, and a request for user consent is generated. In one example embodiment, the request can include the generation of a user interface control that allows the user to agree to proposed modifications to select one or more of the proposed modifications or to take other suitable actions. The algorithm then proceeds to 320.

At 320, it is determined whether a user has consented to make the hardware compliant. If it is determined that the user has not consented, then the algorithm proceeds to 308, otherwise the algorithm proceed to 322.

At 322, modules required to bring the hardware into compliance are obtained. In one example embodiment, an OpenManage Enterprise/System Management Console can fetch the modules required for meeting compliance. The algorithm then proceeds to 324.

At 324, the modules are executed in the target environment, such as automatically or in response to one or more user entered selections of user controls that are generated for one or more modules or groups of modules. The algorithm then proceeds to 308.

In operation, algorithm 300 can be used to detect hardware configuration solutions in a user environment, such as to allow a new workstation or server to be configured to a specific network configuration without substantial user involvement or for other suitable purposes. Although algorithm 200 is shown as a flow chart, it can also or alternatively be implemented as an object-oriented diagram, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A process for configuring hardware in a network environment, comprising:
    retrieving a catalog index using a processor;
    selecting a catalog from the catalog index for a new hardware component;
    selecting a plurality of software applications for the new hardware component from the catalog;
    determining a context for the new hardware component as a function of a system management interface mode, wherein the context identifies one or more variable parameters for one or more of a plurality of software applications;
    installing the plurality of software applications on the new hardware component as a function of the context;
    determining the context as a function of an in-band system management interface mode or out-of-band system management interface mode; and
    determining the context for the new hardware component from the catalog if it is determined that the system management interface mode is out-of-band.

2. The process of claim 1 further comprising receiving one or more attributes for the new hardware component from a management controller using a context detection catalog data.

3. The process of claim 2 further comprising evaluating the one or more attributes to identify one or more additional variable parameters for one or more of the plurality of software applications operating on a node.

4. The process of claim 1 further comprising determining the context for the new hardware component from a network environment if it is determined that the system management interface mode is in-band.

5. The process of claim 4 further comprising downloading one or more modules associated with the plurality of software applications.

6. The process of claim 5 further comprising executing the one or more modules.

7. The process of claim 6 further comprising determining one or more metrics as a function of the one or more modules after execution.

8. The process of claim 7 further comprising storing a configuration of the new hardware component as a result of the one or more metrics.

9. The process of claim 1 further comprising performing a compatibility analysis on the new hardware component using the processor.

10. The process of claim 9 further comprising determining whether the new hardware component is compliant as a function of the compatibility analysis.

11. The process of claim 10 further comprising retrieving one or more modules if it is determined that the new hardware component is not compliant.

12. The process of claim 11 further comprising executing the one or more modules.

13. A system, comprising:
a processor having stored algorithmic instructions that cause the processor to be configured to retrieve data from one or more data registers and to process the data, the algorithmic instructions comprising:
retrieving a catalog index from the one or more data registers using the processor if it is determined that a system management interface mode is out-of-band;
selecting a catalog for a new hardware component using the processor;
selecting a plurality of software applications for the new hardware component from the catalog using the processor;
determining a context for the new hardware component, wherein the context identifies one or more variable parameters for one or more of a plurality of software applications using the processor; and
installing the plurality of software applications on the new hardware component as a function of the context using the processor.

14. The system of claim 13 wherein the algorithmic instructions further comprise determining the context for the new hardware component from the catalog.

15. The system of claim 14 wherein the algorithmic instructions further comprise receiving one or more attributes for the new hardware component from a management controller.

16. The system of claim 15 wherein the algorithmic instructions further comprise evaluating the one or more attributes to identify one or more additional variable parameters for one or more of the plurality of software applications.

17. The system of claim 13 wherein the algorithmic instructions further comprise determining the context for the new hardware component from a network environment if it is determined that the system management interface mode is in-band.

18. A process for configuring hardware in a network environment, comprising:
retrieving a catalog index using a processor;
selecting a catalog from the catalog index for a new hardware component;
selecting a plurality of software applications for the new hardware component from the catalog;
determining a context for the new hardware component as a function of a system management interface mode, wherein the context identifies one or more variable parameters for one or more of a plurality of software applications;
installing the plurality of software applications on the new hardware component as a function of the context;
determining the context as a function of an in-band system management interface mode or out-of-band system management interface mode; and
determining the context for the new hardware component from the catalog if it is determined that the system management interface mode is out-of-band; and
evaluating one or more attributes to identify one or more additional variable parameters for one or more of the plurality of software applications operating on a node.

19. The process of claim 18 further comprising determining the context for the new hardware component from a network environment if it is determined that the system management interface mode is in-band.

20. The process of claim 18 further comprising downloading one or more modules associated with the plurality of software applications.

* * * * *